(12) United States Patent
Alexandron et al.

(10) Patent No.: US 8,607,033 B2
(45) Date of Patent: Dec. 10, 2013

(54) SEQUENTIALLY PACKING MASK SELECTED BITS FROM PLURAL WORDS IN CIRCULARLY COUPLED REGISTER PAIR FOR TRANSFERRING FILLED REGISTER BITS TO MEMORY

(75) Inventors: Nimrod Alexandron, Shimshit (IL); Alexander Rabinovitch, Kfar Yona (IL); Leonid Dubrovin, Karney Shomron (IL)

(73) Assignee: LSI Corporation, San Jose, CA (US)

( * ) Notice: Subject to any disclaimer, the term of this patent is extended or adjusted under 35 U.S.C. 154(b) by 644 days.

(21) Appl. No.: 12/875,400

(22) Filed: Sep. 3, 2010

(65) Prior Publication Data

US 2012/0059998 A1    Mar. 8, 2012

(51) Int. Cl.
*G06F 9/312* (2006.01)

(52) U.S. Cl.
USPC .......................................... 712/225; 712/300

(58) Field of Classification Search
None
See application file for complete search history.

(56) References Cited

U.S. PATENT DOCUMENTS

| | | | | |
|---|---|---|---|---|
| 4,881,168 A | * | 11/1989 | Inagami et al. | 712/5 |
| 6,052,769 A | * | 4/2000 | Huff et al. | 712/3 |
| 6,718,492 B1 | | 4/2004 | Shavit et al. | 714/701 |
| 7,685,408 B2 | | 3/2010 | Wolff et al. | 712/224 |
| 7,783,860 B2 | * | 8/2010 | Luick et al. | 712/6 |
| 2009/0172348 A1 | * | 7/2009 | Cavin | 712/4 |

\* cited by examiner

*Primary Examiner* — Kenneth Kim
(74) *Attorney, Agent, or Firm* — Christopher P. Maiorana, PC

(57) ABSTRACT

An apparatus having a first circuit and a second circuit is disclosed. The first circuit may be configured to generate a plurality of packed items by extracting-and-packing a plurality of input data words based on a bit mask. The second circuit may be configured to (i) receive the packed items from the first circuit, (ii) sequentially buffer the packed items in a plurality of registers, at least one of the packed items crossing a boundary between a current one of the registers and a next one of the registers, and (iii) write the packed items in the current register to a memory in response to the current register becoming full.

20 Claims, 7 Drawing Sheets

| PROCESSED DATA NUMBER | DATA IN REGISTER | BIT MASK REG | SADDR | TRANS REG 2 | TRANS REG 1 | INCREMENTOR | MADDR | VALID |
|---|---|---|---|---|---|---|---|---|
| 1 | 11100011 | 01010101 | 0 | XXXXXXXX | ZZZZ1001 | 0 | 0x12345678 | 0 |
| 2 | 00011000 | 01010101 | 4 | XXXX ZZZZ | 0100 1001 | 0 | 0x12345678 | 1 |
| 3 | 10011001 | 01010101 | 0 | ZZZZ 0101 | 0100 1001 | 1 | 0x12345679 | 0 |
| 4 | 00110011 | 01010101 | 4 | 0101 0101 | 0101 ZZZZ | 1 | 0x12345679 | 1 |

FIG. 4

| PROCESSED DATA NUMBER | DATA IN REGISTER | BIT MASK REG | SADDR | TRANS REG 2 | TRANS REG 1 | INCREMENTOR | MADDR | VALID |
|---|---|---|---|---|---|---|---|---|
| 1 | 11100011 | 01010111 | 0 | XXXXXXXX | ZZZ10011 | 0 | 0x12345678 | 0 |
| 2 | 00011000 | 01010111 | 5 | XXX ZZZ01 01 | 000 10011 | 0 | 0x12345678 | 1 |
| 3 | 10011001 | 01010111 | 2 | Z01001 01 | 000 100 ZZ | 1 | 0x12345679 | 0 |
| 4 | 00110011 | 01010111 | 7 | 1 01001 01 | 0 ZZZ0101 | 1 | 0x12345679 | 1 |

FIG. 5

| PROCESSED DATA NUMBER | INCREMENTOR | MADDR | TRANS REG 2 | TRANS REG 1 | BIT MASK REG | SADDR | DATA OUT REGISTER |
|---|---|---|---|---|---|---|---|
| 0 | 0 | 0x12345678 | XXXXXXXX | 000 10011 | 01010111 | 0 | XXXXXXXX |
| 1 | 1 | 0x12345679 | 1 01001 01 | 000 10011 | 01010111 | 0 | Z1Z0Z011 |
| 2 | 1 | 0x12345679 | 1 01001 01 | 000 10011 | 01010111 | 5 | Z0Z1Z000 |
| 3 | 2 | 0x1234567A | 1 01001 01 | XXXX 0101 | 01010111 | 2 | Z0Z1Z001 |
| 4 | 2 | 0x1234567A | 01001 01 | XXXX 0101 | 01010111 | 7 | Z0Z1Z011 |

SEQUENTIALLY PACKING MASK SELECTED BITS FROM PLURAL WORDS IN CIRCULARLY COUPLED REGISTER PAIR FOR TRANSFERRING FILLED REGISTER BITS TO MEMORY

FIELD OF THE INVENTION

The present invention relates to digital signal processing generally and, more particularly, to a method and/or apparatus for implementing a bit mask extract and pack for boundary crossing data.

BACKGROUND OF THE INVENTION

Bit packing and unpacking instructions are used in many video, audio and baseband applications. However, existing ways to extract and pack the bits take many core cycles of a processor to complete. Manipulation of the data is commonly done in registers or memory locations. Therefore, many processor cycles are used to check how many unused bits are left in the register/memory location, fetch new bits if room is available, and treat boundary crossing conditions.

SUMMARY OF THE INVENTION

The present invention concerns an apparatus having a first circuit and a second circuit. The first circuit may be configured to generate a plurality of packed items by extracting-and-packing a plurality of input data words based on a bit mask. The second circuit may be configured to (i) receive the packed items from the first circuit, (ii) sequentially buffer the packed items in a plurality of registers, at least one of the packed items crossing a boundary between a current one of the registers and a next one of the registers, and (iii) write the packed items in the current register to a memory in response to the current register becoming full.

The objects, features and advantages of the present invention include providing a method and/or apparatus for implementing a bit mask extract and pack for boundary crossing data that may (i) provide fully automatic self-modifiable packing and/or unpacking operations, (ii) use a mask register to control the packing and/or unpacking operations, (iii) automatically write packed words to a memory during packing operations, (iv) automatically fetch packed words from the memory during unpacking operations, (v) accommodate data boundary crossing conditions, and/or (vi) operate in response to a single digital signal processor instruction.

BRIEF DESCRIPTION OF THE DRAWINGS

These and other objects, features and advantages of the present invention will be apparent from the following detailed description and the appended claims and drawings in which:

FIG. 4 is a table of example values for the extract-and-pack operation;

FIG. 5 is a table of more example values for the extract-and-pack operation;

FIG. 7 is a table of example values for the unpack-and-pad operation.

DETAILED DESCRIPTION OF THE PREFERRED EMBODIMENTS

Some embodiments of the present invention generally establish a way to provide fully-automatic self-modifiable packing and unpacking processes using dedicated digital signal processing (DSP) instructions. The packing operations and the unpacking operations are generally controlled by a bit mask register and multiple transfer registers that are stored/loaded automatically during the packing/unpacking operations.

Figure 1:
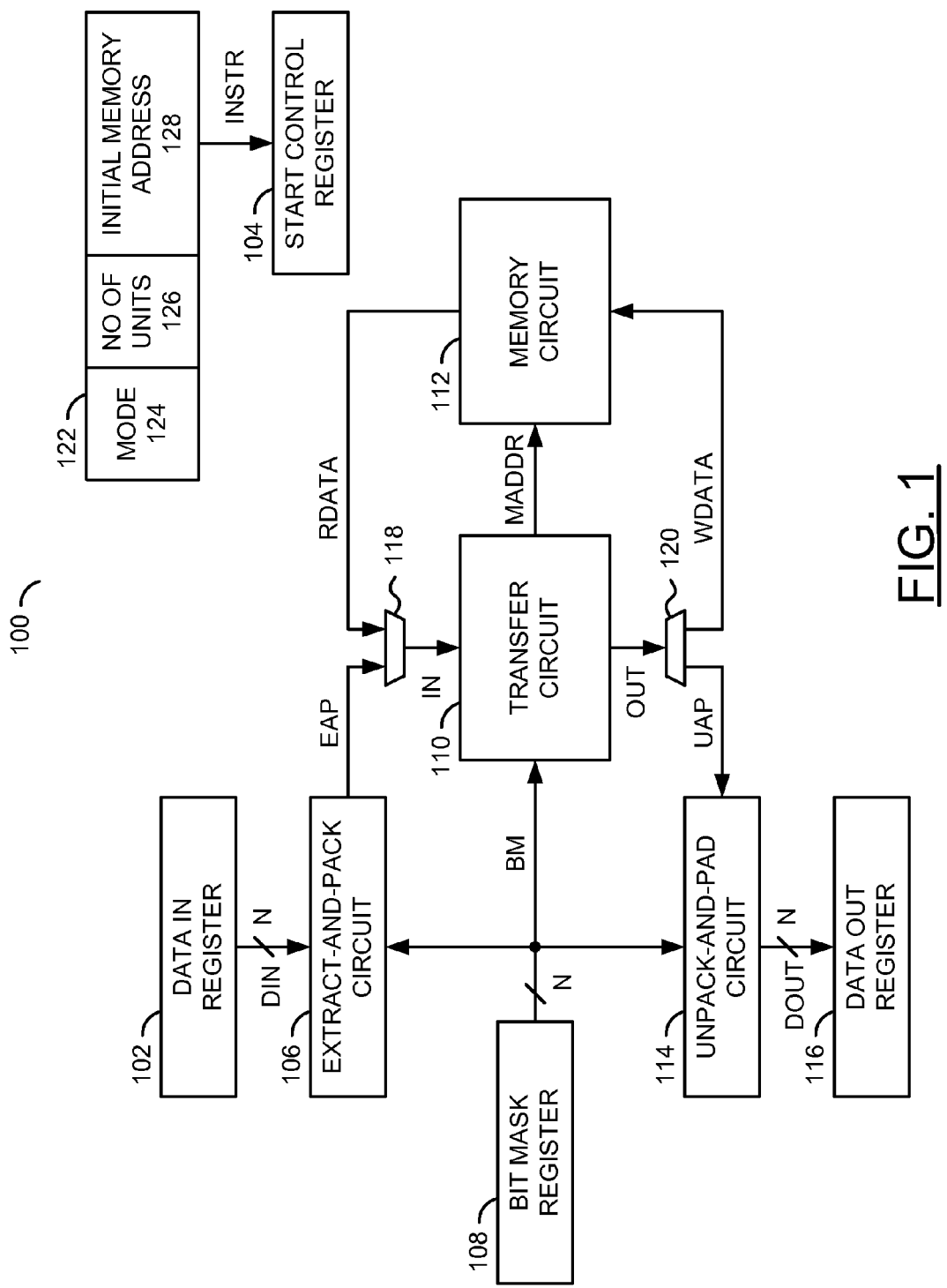
FIG. 1 is a block diagram of an apparatus in accordance with a preferred embodiment of the present invention.

Referring to FIG. 1, a block diagram of an apparatus 100 is shown in accordance with a preferred embodiment of the present invention. Apparatus (or circuit or device) 100 may be configured for an efficient and fast way to execute an extract-and-pack operation and/or an unpack-and-pad operation. The apparatus 100 generally comprises a circuit (or module) 102, a circuit (or module) 104, a circuit (or module) 106, a circuit (or module) 108, a circuit (or module) 110, a circuit (or module) 112, a circuit (or module) 114, a circuit (or module) 116, a circuit (or module) 118 and a circuit (or module) 120. The circuits 102 to 120 may represent modules and/or blocks that may be implemented as hardware, firmware, software, a combination of hardware, firmware and/or software, or other implementations. In some embodiments, the apparatus 100 may be implemented as part of a digital signal processor.

The circuit 102 may present a signal (e.g., DIN) to the circuit 106. A signal (e.g., INSTR) may be received by the circuit 104. The circuit 106 may generate a signal (e.g., EAP) received by the circuit 118. A signal (e.g., BM) may be generated by the circuit 108 and received by the circuits 106, 110 and 114. The circuit 110 may generate a signal (e.g., MADDR) that is transferred to the circuit 112. The circuit 110 may also generate a signal (e.g., OUT) received by the circuit 120. A signal (e.g., IN) may be transferred from the circuit 118 to the circuit 110. The circuit 112 may generate a signal (e.g., RDATA) received by the circuit 118. A signal (e.g., WDATA) may be transferred from the circuit 120 to the circuit 112. The circuit 120 may also present a signal (e.g., UAP) to the circuit 114. The circuit 114 may generate a signal (e.g., DOUT) received by the circuit 116.

The circuit 102 may implement a data register circuit. The circuit 102 is generally operational to buffer an input data word. The circuit 102 generally has a given bit width (e.g., N bits wide) that matches the input data word. The buffered data word may be presented in the signal DIN to the circuit 106.

The circuit 104 may implement another data register circuit. The circuit 104 is generally operational to buffer a DSP instruction (e.g., reference number 122). The DSP instruction may be received by via the signal INSTR. The circuit 104 generally has a predetermined bit width. The information within the buffered instruction may be available to the other circuits of the apparatus 100.

The circuit 106 may implement an extract-and-pack circuit. The circuit 106 may be operational to both (i) generate a packed item by extracting one or more bits from the input data word according to a bit mask and (ii) pack the extracted bits into the signal EAP. The input data word may be received via the signal DIN. The bit mask may be received in the signal BM. For each bit position in the bit mask containing an extract value (e.g., a logical one), the corresponding bit in the input data word may be extracted and packed into the packed item. For each bit position in the bit mask containing a non-extract value (e.g., a logical zero), the corresponding bit in the input data word may be discarded. An arrangement of the extracted bits in the packed item may be justified (e.g., right justified) to a single side, with the unused bit positions containing don't care values (e.g., logical zeros).

The circuit 110 generally implements a transfer circuit. The circuit 110 generally operates in two modes, an extract mode and an unpack mode. The circuit 110 may be operational to generate a memory address in the signal MADDR to control reading and writing to and from the circuit 112.

In the extract mode, the circuit 110 may be operational to (i) receive the packed items from the circuit 106, (ii) sequentially buffer the packed items in multiple registers and (iii) write the packed items in a current register (e.g., a write data word) to the circuit 112 in response to the current register becoming full. The packed items may cross a boundary between the current register and a next (adjoining) register. The packed items may be received in the signal IN. All bits of the packed items in the current register generally form a write data word that is transferred in the signal WDATA.

In the unpack mode, the circuit 110 may be operational to (i) read one or more stored data words from the circuit 112, (ii) sequentially buffer the read (stored) data words in the registers and (iii) copy the packed items from the registers to the circuit 114 based on the bit mask. Each of the read data words stored in the circuit 112 generally contains one or more of the packed items. The read data words may be received from the circuit 112 in the signal RDATA. At least one of the packed items in the read data words may cross the boundary between the current register and the next register. Parsing of the packed items from the read data words may be determined by the number of bits in the bit mask that have the extract value. The packed items copied from the read data words may be transferred to the circuit 114 in the signal UAP.

The circuit 112 may implement a memory circuit. The circuit 112 may be operational to store the write data words received in the signal WDATA and present the read data words in the signal RDATA. Addressing of the data words for both read and write operations may be controlled by a memory address received in the signal MADDR.

The circuit 114 may implement an unpack-and-pad circuit. The circuit 114 is generally operational to both (i) generate an output data word by unpacking the bits of the parsed item in the signal UAP into the extract bit positions defined in the bit mask and (ii) insert pad values (e.g., don't care values) into the output data word at the non-extract positions. The output data word may be presented in the signal DOUT. The bit mask may be received in the signal BM. An arrangement of the extracted bits in the packed item may be justified (e.g., right justified) to a single side, with the unused bit positions containing don't care values.

The circuit 116 may be implemented as a data register circuit. The circuit 116 is generally operational to buffer an output data word as received in the signal DOUT. The circuit 116 generally has the N-bit width to match the output data word.

The circuit 118 may implement a multiplexer circuit. The circuit 118 is generally operational to selectively route the signal EAP or the signal RDATA to the signal IN. While in the extract mode, the circuit 118 may route the packed items in the signal EAP to the signal IN. While in the unpack mode, the circuit 118 may route the stored data words in the signal RDATA to the signal IN.

The circuit 120 may implement a demultiplexer circuit. The circuit 120 is generally operational to selectively route the OUT to the signal UAP or the signal WDATA. While in the extract mode, the circuit 120 may route the write data words in the signal OUT to the signal WDATA. While in the unpack mode, the circuit 120 may route the packed items in the signal OUT to the signal UAP.

Operations of the apparatus 100 may be controlled by writing a DSP instruction 122 from a processor into the circuit 104. The instruction 122 generally comprises a field (or parameter) 124, a field (or parameter) 126 and a field (or parameter) 128. Once an instruction 122 is written into the circuit 104, the apparatus 100 may operate on all data specified by the instruction 122 until complete and without any additional instructions or involvement from the processor.

The field 124 generally contains mode information. The mode information may command the apparatus 100 to operate in either the extract mode or the unpack mode.

The field 126 may contain a number of units to be processed. For the extract mode, the number of units may identify a number of input data words to undergo the extract-and-pack operation. In the unpack mode, the number of units may identify a number of packed items to undergo the unpack-and-pad operation.

The field 128 may contain an initial memory address in the circuit 112. In the extract mode, the initial memory address may point to the memory location in the circuit 112 where an initial write data word is written. In the unpack mode, the initial memory address may point to the memory location in the circuit 112 from which an initial read data word is read.

Figure 2:
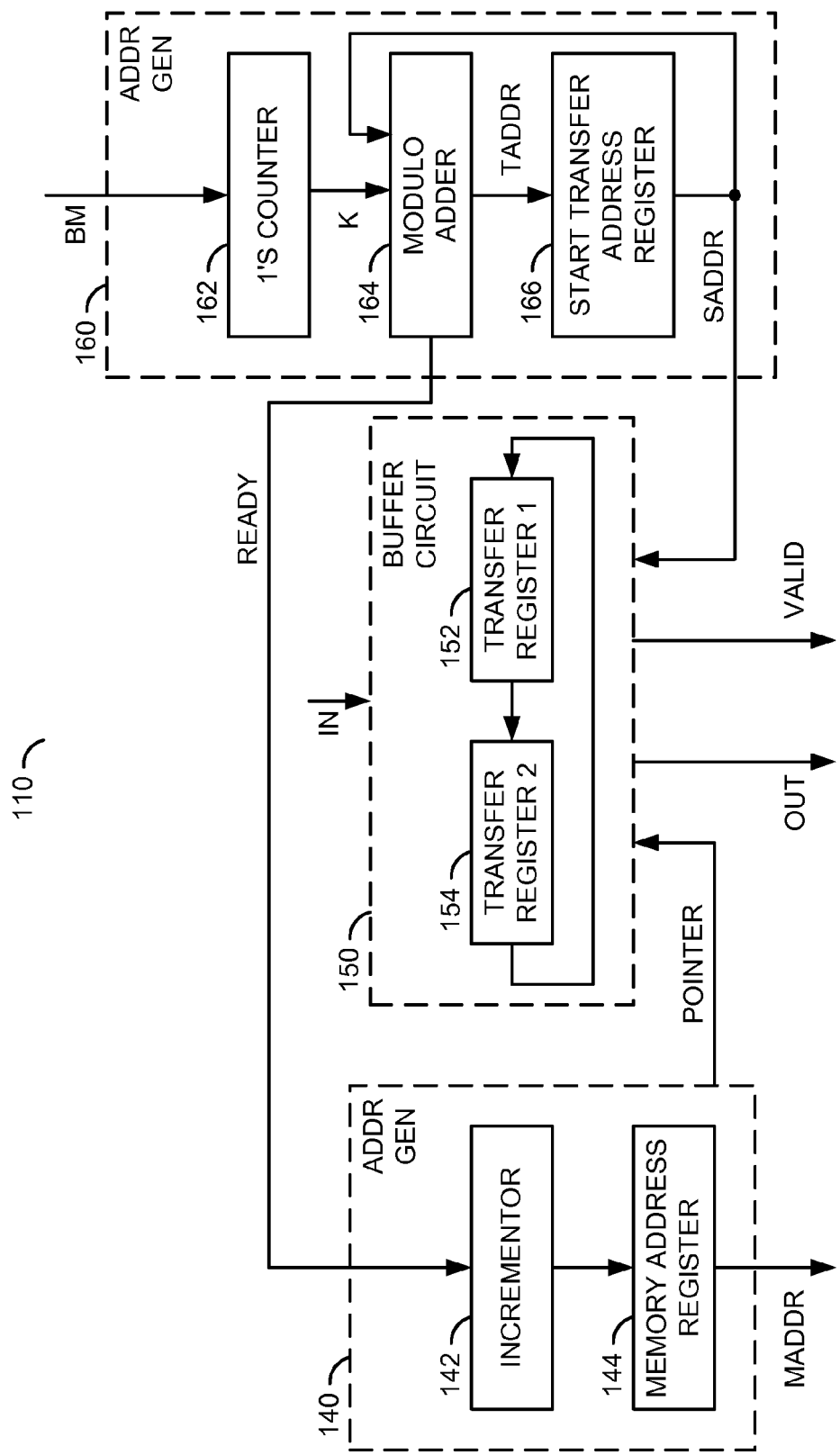
FIG. 2 is a block diagram of an example implementation of a transfer circuit in the apparatus.

Referring to FIG. 2, a block diagram of an example implementation of the circuit 110 is shown. The circuit 110 may comprise a circuit (or module) 140, a circuit (or module) 150 and a circuit (or module) 160. The circuit 140 generally comprises a circuit (or module) 142 and a circuit (or module) 144. The circuit 150 may include a circuit (or module) 152 and a circuit (or module) 154. The circuit 160 generally includes a circuit (or module) 162, a circuit (or module) 164 and a circuit (or module) 166. The circuits 140 to 166 may represent modules and/or blocks that may be implemented as hardware, firmware, software, a combination of hardware, firmware and/or software, or other implementations.

The signal IN may be received by the circuit 150. The signal BM may be received by the circuit 162. The signal MADDR may be presented by the circuit 144. The circuit 150 may present the signal OUT. A signal (e.g., K) may be generated by the circuit 162 and received by the circuit 164. The circuit 164 may generate a signal (e.g., READY) received by the circuit 142. A signal (e.g., TADDR) may be generated by the circuit 164 and received by the circuit 166. The circuit 166 may generate a signal (e.g., SADDR) received by the circuit 150 and the circuit 164. The circuit 140 may generate a signal (e.g., POINTER) received by the circuit 150. A signal (e.g., VALID) may be generated by the circuit 150.

The circuit 140 may implement an address generator circuit. The circuit 140 is generally operational to generate (i) a memory address in the signal MADDR and (ii) one or more pointers in the signal POINTER. The pointers generally identify which of the circuits 152 to 154 is considered a current circuit (register). The circuit 140 may also be operational to (i) increment the memory address in the signal MADDR and (ii) move the pointers to a different one of the circuits 152 to 154 in response to the signal READY being asserted. The circuit 140 may also initiate a write of a write data word from the circuit 150 to the circuit 112 in the extract mode. In the unpack mode, the circuit 140 may initiate a read of read data words from the circuit 112 to the circuit 150.

The circuit 142 may implement an incrementor circuit. The circuit 142 may be operational to receive the initial memory address from the circuit 104 and increment the memory address by a single step each time the signal READY is asserted. The single step may be sized to write/read a single data word to/from the circuit 112.

The circuit 144 may implement a register circuit. The circuit 144 may be operational to buffer the memory address as generated by the circuit 142. The buffered memory address may be presented in the signal MADDR.

The circuit 150 may implement a buffer circuit. The circuit 150 is generally operational to store data received in the signal IN and transfer copies of the stored data in the signal OUT. Each of the circuits 152 to 154 may be implemented as a data register circuit. The circuits 152 to 154 may be arranged in a wrap-around loop with (i) the most significant bit of a starting circuit (e.g., circuit 152) being followed by the least significant bit of another circuit (e.g., circuit 154) and so on until (ii) the most significant bit of a final circuit (e.g., circuit 154) wraps around to the least significant bit of the starting circuit (e.g., circuit 152). As such, a data word and/or packed item received in the signal IN may be stored into the circuits 152 to 154 beginning at any bit position, as determined by the signal SADDR. Likewise, any data word and/or packed item may be read from the circuits 152 to 154 in the signal OUT starting at any bit position, as determined by the signal SADDR. Therefore, packed items in the data words may cross any boundary between the circuits 152 to 154.

The circuit 160 generally implements an address generator circuit. The circuit 160 may be operational to generate a start address in the signal SADDR in response to (i) the bit mask, (ii) a bit width of the individual circuits 152 to 154 and (iii) a number of packed items that have been previously transferred. The circuit 160 may also generate the signal READY in an asserted state where the next data to be accessed is outside the current circuit 152 or 154.

The circuit 162 may implement a one's counter circuit. The circuit 162 is generally operational to count the number of extract values (e.g., logical ones) in the bit mask stored in the circuit 108. The counted number of extracted values may be presented in the signal K to the circuit 164.

The circuit 164 may be implemented as a modulo adder circuit. The circuit 164 is generally operational to modulus add the extracted value count to the current start address for each access to the circuit 150. The sum of the addition may be a new start address, which is presented in the signal TADDR. The new start address may be calculated as follows:

New start address=(Current start address+K) MOD N, where K represents the number of extraction values in the bit mask (e.g., the number of 1's) and N is a bit width of the circuits 152 to 154. An initial current start address may point to the least significant bit of the circuit 152 (e.g., a zero address). When the modulus addition exceeds the value N and wraps around, the circuit 164 may assert the signal READY.

The circuit 166 may implement a register circuit. The circuit 166 may be operational to buffer the current start address. The current start address may be presented by the circuit 166 in the signal SADDR.

Figure 3:
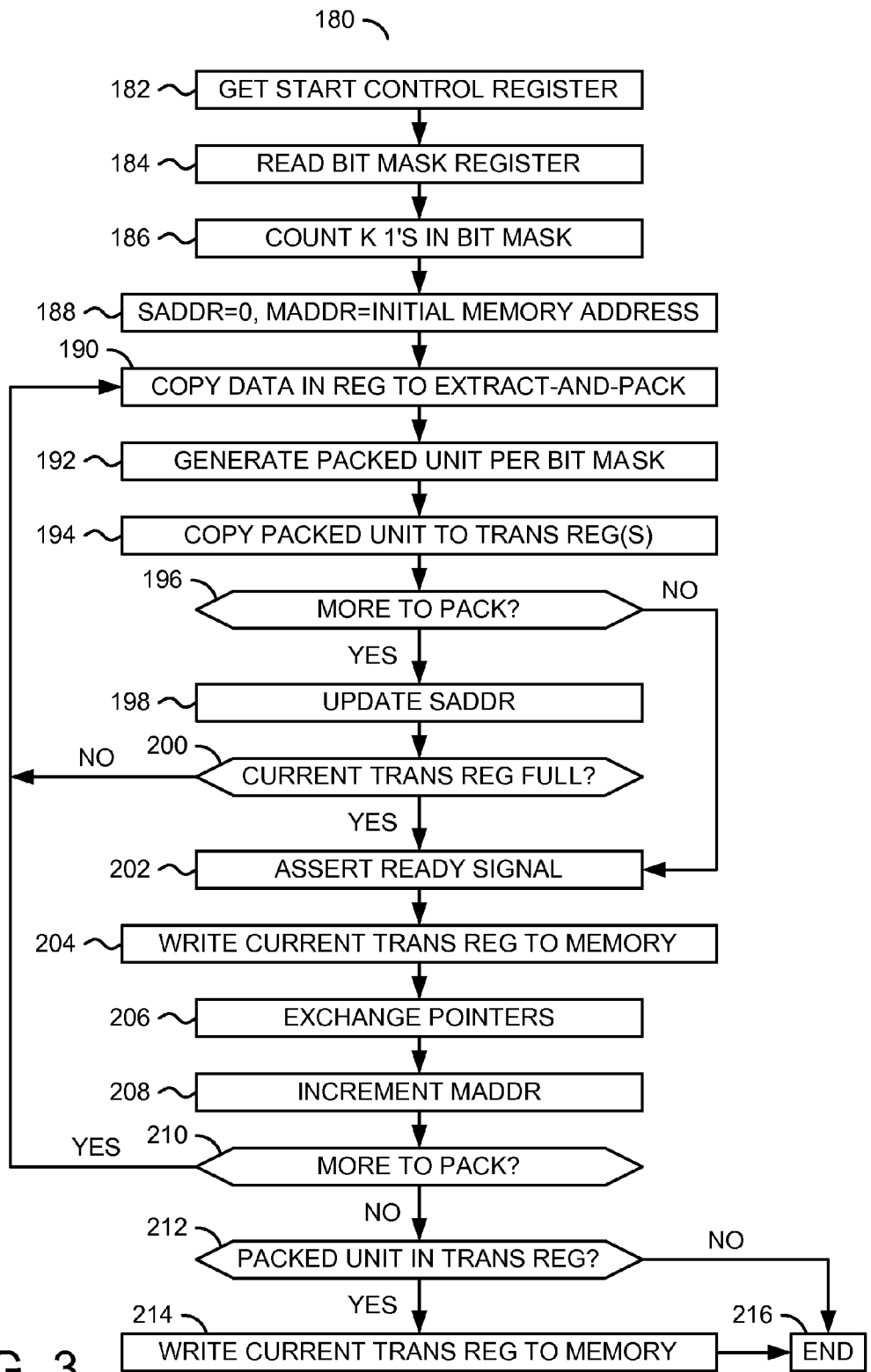
FIG. 3 is a flow diagram of an example extract-and-pack operation.

Referring to FIG. 3, a flow diagram of an example extract-and-pack operation 180 is shown. The method (or process) 180 may be implemented by the apparatus 100. The method 180 generally comprises a step (or block) 182, a step (or block) 184, a step (or block) 186, a step (or block) 188, a step (or block) 190, a step (or block) 192, a step (or block) 194, a step (or block) 196, a step (or block) 198, a step (or block) 200, a step (or block) 202, a step (or block) 204, a step (or block) 206, a step (or block) 208, a step (or block) 210, a step (or block) 212, a step (or block) 214 and a step (or block) 216. The steps 182 to 216 may represent modules and/or blocks that may be implemented as hardware, firmware, software, a combination of hardware, firmware and/or software, or other implementations.

Referring to FIG. 4, a table of example values is shown. The values may be used below to describe the operation of the method 180. In the step 182, the apparatus 100 may get the instruction 122 in the circuit 104. The circuit 162 may read the bit mask (e.g., 01010101) from the circuit 108 in the step 184 and count K extract values (e.g., four 1's) in the step 186. In the step 188, the circuit 160 may initialize the start address to zero and the circuit 140 may initialize the memory address to the initial address (e.g., 0x12345678) provided by the instruction 122 in the field 128.

In the step 190, an initial input data word (e.g., 11100011) may be copied from the circuit 102 to the circuit 106. The circuit 106 may generate a packed item (e.g., ZZZZ1001) by extracting the bits from the input data word in the step 192 that correspond to the extract values bit positions in the bit mask. In the step 194, the packed item may be copied into the current circuit 152 per the signal POINTER starting at the address SADDR (e.g., 0=least significant bit). In some embodiments, the bit positions marked by "Z" may be filled with zero values or one values. In other embodiments, the bit positions marked by "Z" may not be coped from the circuit 106 to the circuit 150. The bit positions in the circuit 150 marked by "X" may be don't care values.

A check may be performed by the apparatus 100 in the step 196 to determine if more input data words are to be packed. If more packing is to be performed (e.g., the YES branch of step 196), the method 180 may continue with the step 198 where the next start address (e.g., 4) is calculated by the circuit 164. A check may be performed by the circuit 164 in the step 200 to determine if the current circuit 152 has been filled. If the current circuit 152 still has unused bits (e.g., the NO branch of step 200), the method 180 may return to the step 190 and read a next input data word (e.g., 00011000) from the circuit 102.

Step 192 may generate the next packed item (e.g., ZZZZ0100). Step 194 may copy the packed item into the circuits 152 and 154 starting at the address 4 of the circuit 152. Since the circuit 152 has only four unused bits (e.g., bits now marked with "Z"), the four least significant bits of the next packed item may be stored in the circuit 152 and the four most significant bits may be stored in the circuit 154.

As part of the calculation of the next start address, the circuit 164 may determine that the start address has exceeded the width of the current circuit 152 and so rolls over the start address (e.g., roll over from 8 to 0) and asserts the signal READY in the step 202. The circuit 140 may respond to the assertion of the signal READY in the step 204 by copying the data in the current circuit 152 to the circuit 112. The copy operation may write the packed items to the initial memory address in the circuit 112. After the write has taken place, the circuit 140 may exchange the pointers from the circuit 152 to the circuit 154 in the step 206 such that the circuit 154 becomes the current circuit (register). The circuit 142 may also increment the memory address by an address step size (e.g., 0x12345678 to 0x12345679) in the step 208. Another check may be performed by the circuit 106 in the step 210 to determine if the packing should continue. If more input data words are to be extracted and packed (e.g., the YES branch of step 210), the method 180 may return to the step 190 to obtain another input data word from the circuit 102.

Once the last input data word has been processed and stored to the circuit 150 (e.g., the NO branch of step 196), the circuit 164 may asserts the signal READY. The circuit 140 may response to the asserted signal READY by copying the contents of the current circuit 152 or 154 to the circuit 112. If the step 210 also concludes that the last input data word has been extracted and packed (e.g., the NO branch of step 210), a check may be made by the circuit 110 in the step 212 to determine if the last packed item crossed a boundary between the circuits 152 and 154. If a boundary crossing took place (e.g., the YES branch of step 212), the circuit 140 may copy the contents of the current circuit 152 or 154 to the memory 112. The method 180 may end in the step 216. If the last packed item did not cross a boundary (e.g., the NO branch of step 212), all of the packed items have already been transferred to the circuit 112 and the method 180 may end in the step 216. Using the example data from FIG. 4, the circuit 112 may contain a stored data word 01001001 at address 0x12345678 and a stored data word 01010101 at the address 0x12345679 at the end of the processing.

Referring to FIG. 5, a table of more example values is shown. In the example, the bit mask may have 5 extract values. Therefore, the initial packed item may occupy bit positions 0 to 4 in the current circuit 152. The next packed item may occupy bit positions 5 to 7 in the current circuit 152 and bit positions 0 to 1 in the other circuit 154. Since the current circuit 152 is filled after the next packed item is stored, the circuit 140 may transfer the contents of the current circuit 152 (e.g., the initial packed item and part of the next packed item) to the circuit 112 and switch the pointers so that the circuit 154 becomes the current circuit (register). A subsequent packed item may be stored in the now current circuit 154 in bit positions 2 to 6, leaving bit position 7 still unused. The contents of the circuit 154 may be transferred to the circuit 112 after yet another packed item fills the unused bit position 7, with the rest being wrapped around to bit positions 0 to 4 in the circuit 152. The last data word in the circuit 152 may be transferred to the circuit 112 with the bit positions 5-7 remaining unused. Based on the four input data words of the example, the resulting write data word 00010011 may be at address 0x12345678, write data word 10100101 may be at address 0x12345679 and write data word 0=0101 may be at address 0x1234567A in the circuit 112.

Figure 6:
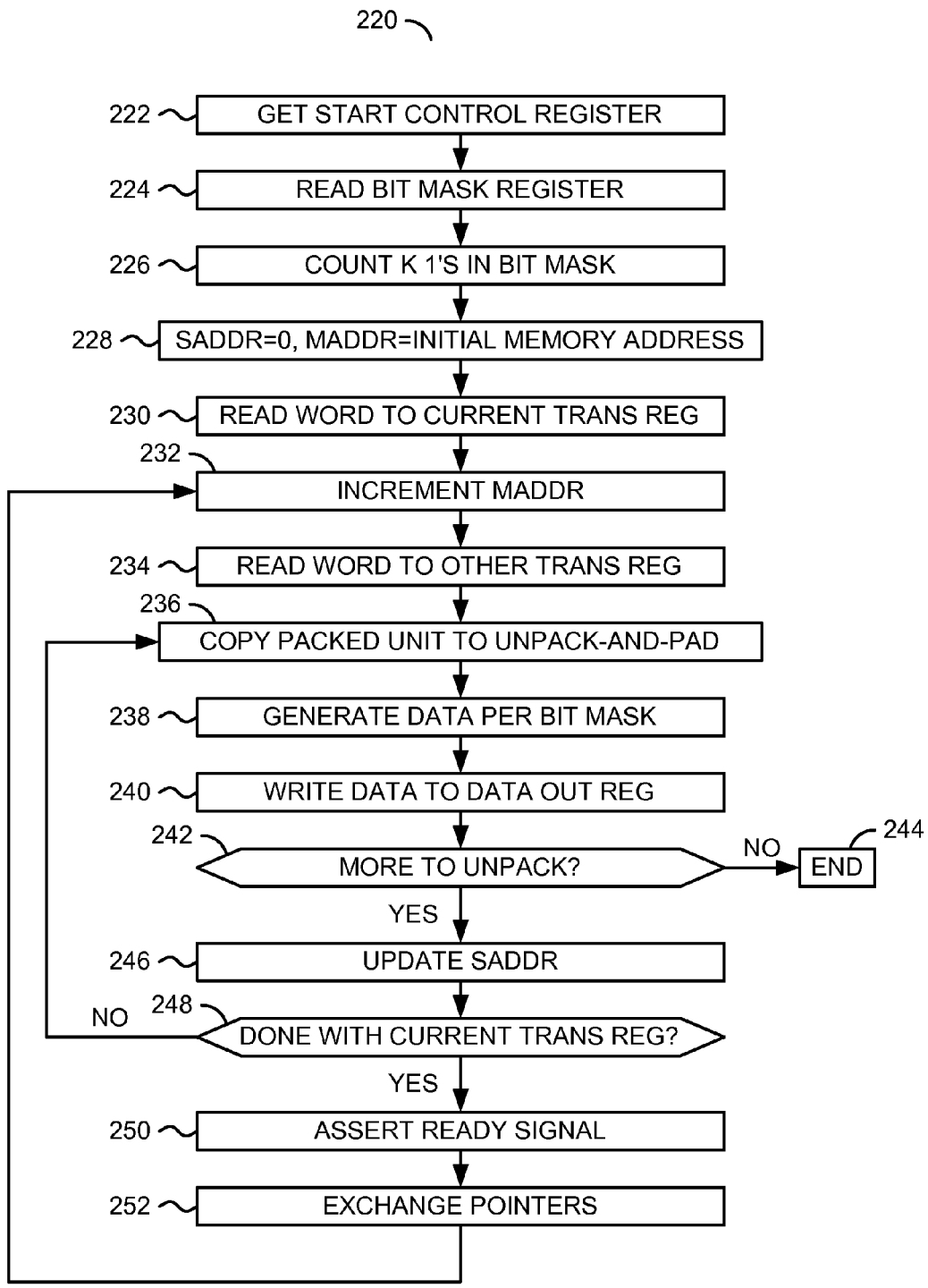
FIG. 6 is a flow diagram of an example unpack-and-pad operation.

Referring to FIG. 6, a flow diagram of an example unpack-and-pad operation 220 is shown. The method (or process) 220 may be implemented by the apparatus 100. The method 220 generally comprises a step (or block) 222, a step (or block) 224, a step (or block) 226, a step (or block) 228, a step (or block) 230, a step (or block) 232, a step (or block) 234, a step (or block) 236, a step (or block) 238, a step (or block) 240, a step (or block) 242, a step (or block) 244, a step (or block) 246, a step (or block) 248, a step (or block) 250 and a step (or block) 252. The steps 222 to 252 may represent modules and/or blocks that may be implemented as hardware, firmware, software, a combination of hardware, firmware and/or software, or other implementations.

Referring to FIG. 7, a table of example values is shown. The values may be used below to describe the operation of the method 220. In the step 222, the apparatus 100 may get an instruction 122 in the circuit 104. The circuit 162 may read the bit mask (e.g., 01010111) from the circuit 108 in the step 184 and count K extract values (e.g., five 1's) in the step 226. In the step 228, the circuit 160 may initialize the start address to zero and the circuit 140 may initialize the memory address to the initial address (e.g., 0x12345678) provided by the instruction 122.

In the step 230, an initial read data word (e.g., 00010011) may be copied from the circuit 112 to the current circuit 152. The circuit 142 may increment the memory address (e.g., INCREMENTOR=1) in the step 232. A next read data word (e.g., 10100101) may be read from the circuit 112 and stored in the other circuit 154.

The circuit 150 may copy an initial packed item (e.g., 10011) from the current circuit 152 to the circuit 114 in the step 236. The copying may start from the bit position identified in the signal SADDR (e.g., bit position 0). The circuit 114 may unpack and pad the packed item in the step 238 per the bit mask to create unpacked-and-padded data (e.g., Z1Z0Z011, where "Z" represents a pad bit such as zero). The unpacked-and-padded data may be written into the circuit 116 in the step 240.

A check may be performed by the circuit 110 in the step 246 to determine if more packed items are available to unpack. The determination is generally based on the number of units (e.g., packed items) presented in the DSP instruction 122 in the field 126. If no more packed items are available (e.g., the NO branch of step 242), the method 220 may end in the step 244. If one or more packed items are available to unpack (e.g., the YES branch of step 242), the circuits 164 and 166 may update the start transfer address in the signal SADDR (e.g., SADDR=5) in the step 246.

A check may be performed by the circuit 164 in the step 248 to determine if all of the packed items in the current circuit 152 have been unpacked. If the current circuit 152 still contains unprocessed packed items (e.g., the NO branch of step 248), the method 220 may return to the step 236 where the circuit 150 parses a next packed item (e.g., 01000) from the circuits 152 and 154. The loop around steps 236 to 248 may continue until all of the packed items in the current circuit 152 have been unpacked (e.g., the YES branch of step 248).

When parsing and unpacking from the current circuit 152 has finished, the circuit 164 may assert the signal READY in the step 250. The circuit 140 may respond to the asserted signal READY by exchanging the pointers in the signal POINTER such that the circuit 154 becomes the current circuit and the circuit 152 becomes the other circuit. The method 220 may return to the step 232 where the circuit 142 increments the memory address (e.g., INCREMENTOR=2). Another read data word (e.g., XXX0101) may be read from the circuit 112 in the step 234 and stored in the other circuit 152. The bits marked as "X" may represent don't care bits. Parsing of another packed item (e.g., 01001) may be performed in the step 236. The method 220 generally continues to step 248, loops back to step 236 and continues with a final packed item (e.g., 01011). In the example illustrated in FIG. 7, the final packed item may cross a boundary between the circuits 154 and 152.

The functions performed by the diagrams of FIGS. 1-3 and 6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to generate a plurality of items by (i) extracting one or more bits from each respective one of a plurality of input data words at one or more respective locations defined in a bit mask and (ii) packing said bits as extracted in a sequence within respective ones of said items, wherein said bit mask is common to at least two of said data words; and
a second circuit configured to (i) receive said items from said first circuit, (ii) sequentially buffer said items in a plurality of registers, at least one of said items crossing a boundary between a current one of said registers and a next one of said registers, and (iii) write said items in said current register to a memory in response to said current register becoming full.

2. The apparatus according to claim 1, further comprising a third circuit configured to receive an instruction from a processor, wherein said instruction conveys (i) how many of said input data words are to be packed and (ii) where in said memory to start writing said items.

3. The apparatus according to claim 1, wherein said registers are arranged in a wrap-around loop that can buffer a largest possible one of said items starting at any bit position within said registers.

4. The apparatus according to claim 1, wherein said second circuit comprises an address generator configured to generate a starting address in response to (i) said bit mask, (ii) a bit width of said current register and (iii) a number of said items that are already buffered in said registers.

5. The apparatus according to claim 4, wherein said starting address indicates a starting bit position in said current register where a current one of said items is written.

6. The apparatus according to claim 4, wherein said address generator is further configured to assert a signal in response to said current register becoming full.

7. The apparatus according to claim 1, wherein said second circuit comprises an address generator configured to generate a memory address that indicates where in said memory said items in said current register are written.

8. The apparatus according to claim 7, wherein said address generator is further configured to generate a pointer that identifies which of said registers is said current register.

9. The apparatus according to claim 8, wherein said address generator in response to an assertion of a signal is further configured to both (i) increment said memory address and (ii) move said pointer to a different one of said registers.

10. The apparatus according to claim 1, further comprising:
a third circuit configured to generate a plurality of output words by (i) unpacking said bits in each respective one of said items based on said locations defined in said bit mask and (ii) padding each position in said output words that lacks one of said bits as unpacked, wherein
said second circuit is further configured to (i) read a plurality of stored data words from said memory, each of said stored data words having greater than one of said items, (ii) sequentially buffer said stored data words in said registers, at least one of said items crossing said boundary between said current register and said next register, and (iii) copy said items from said registers to said third circuit.

11. An apparatus comprising:
a first circuit configured to generate a plurality of output words by (i) unpacking one or more bits in each respective one of a plurality of items based on one or more locations defined in a bit mask and (ii) padding each position in said output words that lacks one of said bits as unpacked, wherein said bit mask is common to at least two of said items; and
a second circuit configured to (i) read a plurality of stored data words from a memory, each of said stored data words having greater than one of said items, (ii) sequentially buffer said stored data words in a plurality of registers, at least one of said items crossing a boundary between a current one of said registers and a next one of said registers, and (iii) copy said items from said registers to said first circuit.

12. The apparatus according to claim 11, further comprising a third circuit configured to receive an instruction from a processor, wherein said instruction conveys (i) how many of said items are to be unpacked and (ii) where in said memory to start reading said stored data words.

13. The apparatus according to claim 11, wherein said registers are arranged in a wrap-around loop that can buffer a largest possible one of said items starting at any bit position within said registers.

14. The apparatus according to claim 11, wherein said second circuit comprises an address generator configured to generate a starting address in response to (i) said bit mask, (ii) a bit width of said current register and (iii) a number of said items that have been previously copied to said first circuit.

15. The apparatus according to claim 14, wherein said starting address indicates a starting bit position in said current register where a current one of said items is buffered.

16. The apparatus according to claim 14, wherein said address generator is further configured to assert a signal in response to processing all of said items in said current register.

17. The apparatus according to claim 11, wherein said second circuit comprises an address generator configured to generate a memory address that indicates where said stored data words are located in said memory.

18. The apparatus according to claim 17, wherein said address generator is further configured to generate a pointer that identifies which of said registers is said current register.

19. The apparatus according to claim 18, wherein said address generator in response to an assertion of a signal is further configured to both (i) increment said memory address and (ii) move said pointer to a different one of said registers.

20. An apparatus comprising:

means for generating a plurality of items by (i) extracting one or more bits from each respective one of a plurality of input data words at one or more respective locations defined in a bit mask and (ii) packing said bits as extracted in a sequence within respective ones of said items, wherein said bit mask is common to at least two of said data words; and means for transferring configured to (i) receive said items from said means for generating, (ii) sequentially buffer said items in a plurality of registers, at least one of said items crossing a boundary between a current one of said registers and a next one of said registers, and (iii) write said items in said current register to a memory in response to said current register becoming full.

\* \* \* \* \*